United States Patent [19]
Miller

[11] 3,810,615
[45] May 14, 1974

[54] EDUCATIONAL GAME: SPACE STATION
[75] Inventor: Kenneth W. Miller, Dallas, Tex.
[73] Assignee: The Raymond Lee Organization, Inc., New York, N.Y.
[22] Filed: Apr. 23, 1973
[21] Appl. No.: 353,894

[52] U.S. Cl.................................. 273/1 E, 35/9 R
[51] Int. Cl. ............................................. A63f 9/18
[58] Field of Search........ 273/1 R, 1 E, 1 M, 141 R, 273/141 A; 35/9 R, 45, 47, 69–71

[56] References Cited
UNITED STATES PATENTS
| | | | |
|---|---|---|---|
| 705,579 | 7/1902 | Gibson | 35/70 UX |
| 2,212,846 | 8/1940 | Pilla | 273/1 R |
| 2,861,809 | 11/1953 | Fischl | 273/141 R |
| 3,722,885 | 3/1973 | Leaf | 273/1 R |

FOREIGN PATENTS OR APPLICATIONS
1,510,910   12/1967   France.................................. 35/71

Primary Examiner—Richard C. Pinkham
Assistant Examiner—Paul E. Shapiro

[57] ABSTRACT

A game employing a game board showing all nine planets. Nine different card receiving means, each associated with a different planet, are disposed on the board. Nine sets of cards, each disposed removably in the corresponding means, each carry questions associated with the particular planet on one face as well as answers to the questions on the opposite face. Each planet is provided with a lamp. A ten position manually operative switch and battery are connected in circuit with the lamps whereby any lamp can be energized individually or all lamps can be dark. Four score keeping devices in the form of moveable pointers are also provided on the game board.

4 Claims, 2 Drawing Figures

PATENTED MAY 14 1974          3,810,615

EDUCATIONAL GAME: SPACE STATION

SUMMARY OF THE INVENTION

My invention is directed toward a game which can be played by from two to four players and which tests the players knowledge of the planets.

The game employs a game board showing all nine planets each of which is provided with a lamp. A ten position manually operable switch is connected in circuit with a battery and the lamps whereby in one position all lamps are dark and in any other position a different one of the lamps is individually energized.

Nine different card receiving means, each associated with a different planet, are disposed on the board. Nine sets of cards, each disposed removably in the corresponding means, each carry questions associated with the particular planet as well as answers to the questions.

The game is then played as described below.

DETAILED DESCRIPTION OF PREFERRED EMBODIMENTS

Figure 1:
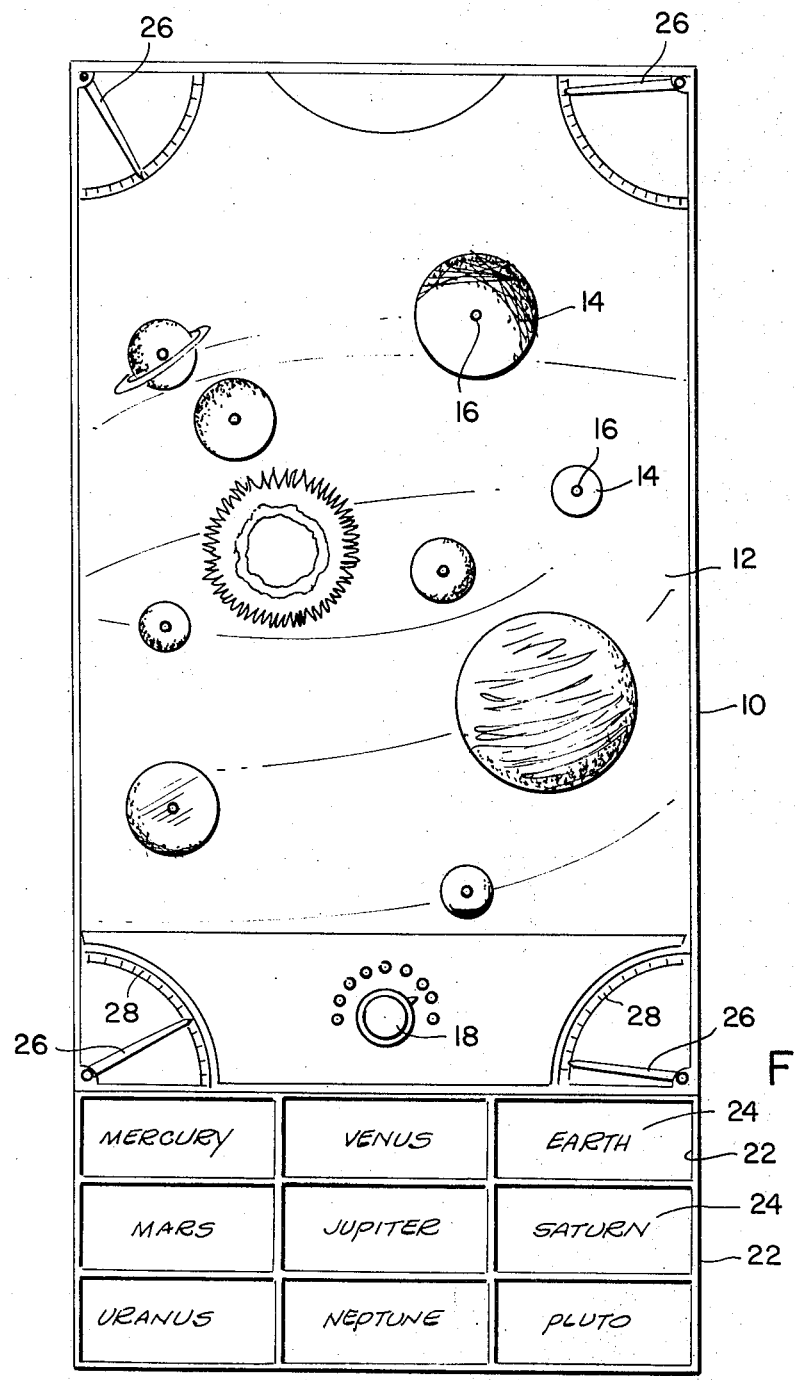
FIG. 1 is a plan view of a game board used in my invention.
Figure 2:
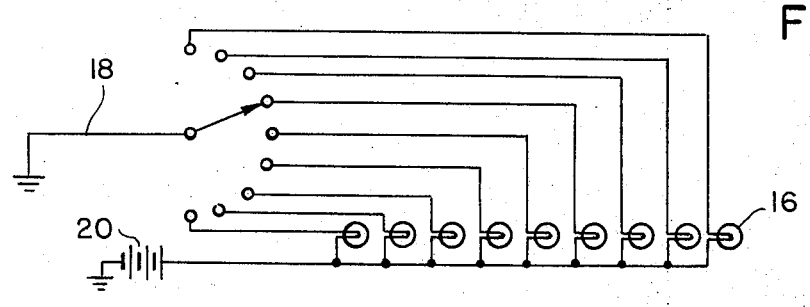
FIG. 2 is a circuit diagram thereof.

Referring now to FIGS. 1 and 2, a game board 10 has a rectangular surface 12 carrying nine different planets 14, each with its own lamp 16. A 10 position manually operable switch 18 is disposed in circuit with lamps 16 and a battery 20. In one switch position, all lamps are dark. In any other switch position, a different lamp is energized and a different planet (properly identified) is illuminated.

Nine different card receiving means 22 are secured to the board spaced from surface 12. A different set of cards 24 is disposed in each means. Each set of cards contain questions about the associated planet as well as answers thereto. Typically a card can have a question on one side and an answer on the other.

Disposed at each of the four corners of surface 12 is a movable pointer 26 associated with an appropriate scale 28.

RULES OF THE GAME

Preliminary Information

Before starting the game the question cards should be assorted and placed in their proper place in the file. There are 81 playing cards with nine cards representing each planet and a separate file for each planet. This game can be adapted to most any age group by changing the questions or by making their own questions on cards for the existing file. The questions will be on the face or front of the card and the answer will be on the back.

Objective of Game

The objective of this game is to raise your spaceship into launching position. This is done by being the first player to score ninety points.

To Start the Game

The starting player is the commander of Information Space Station. He may then choose any planet he wants to ask a question about. This is accomplished by turning on the planet indicator light. This light is left on until the question is answered and another planet is chosen. Then a new planet light is turned on.

1. The player must choose a question card that corresponds with the panel light he has turned on. Example: If Mars is his choice then the player turns on the panel light and takes a question card from the file on Mars.
2. When a player is asked a question and he doesn't know the answer, that card is placed face up on the table.
3. After each incorrect answer a new card is chosen for the next player.
4. The starting player may choose a different planet for his next opponent if he so chooses.
5. The first player to answer a question correctly becomes the Information Space Station commander.
6. Any player must answer a question correctly before he can raise his spaceship.
7. For each correct answer a player receives ten points.
8. For each incorrect answer the player is penalized five points.
9. All scores are kept by moving the spaceship ten degrees for each 10 points scored.

The first player to move his scoring pointer completely across the scale wins.

While I have described my invention with particular reference to the drawings, such is not to be considered as limiting its actual scope.

Having thus described this invention, what is asserted as new is:

1. A game comprising:
   a game board showing all nine planets;
   nine different card receiving means on the board each identified with a different planet;
   nine sets of cards, each set being removably disposed in the corresponding means and carrying questions associated with the corresponding planet as well as answers to these questions;
   nine different lamps on the board each lamp being located on a corresponding planet;
   a 10 position manually operable switch; and
   battery means connected in circuit with the switch and the lamps whereby the switch can be positioned to turn off all the lamps or to selectively energize any one of them.

2. The game of claim 1 wherein means are provided for individually indicating the current score of a plurality of players.

3. The game of claim 2 wherein said plurality is equal to four and each means includes a movable pointer associated with an appropriate scale.

4. The game of claim 3 wherein the portion of the board carrying the planets and switch defines a rectangle and the score indicating means are each located at a different corner of this portion.

* * * * *